May 29, 1951     F. A. REECE     2,555,095
STITCHING MACHINE
Filed Dec. 28, 1948     11 Sheets-Sheet 1
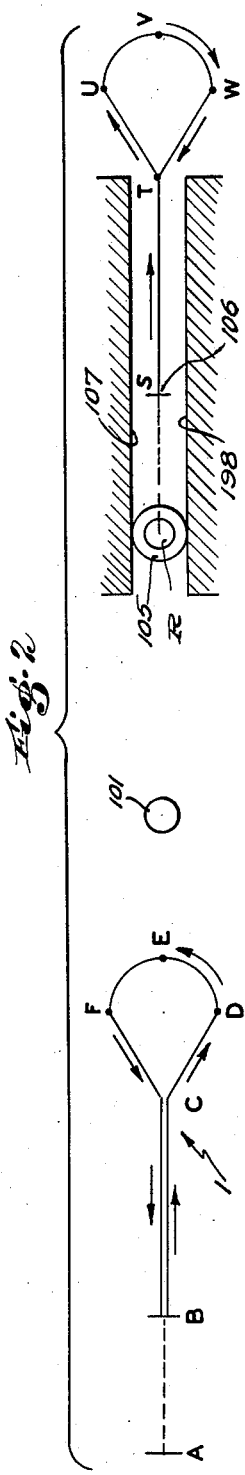
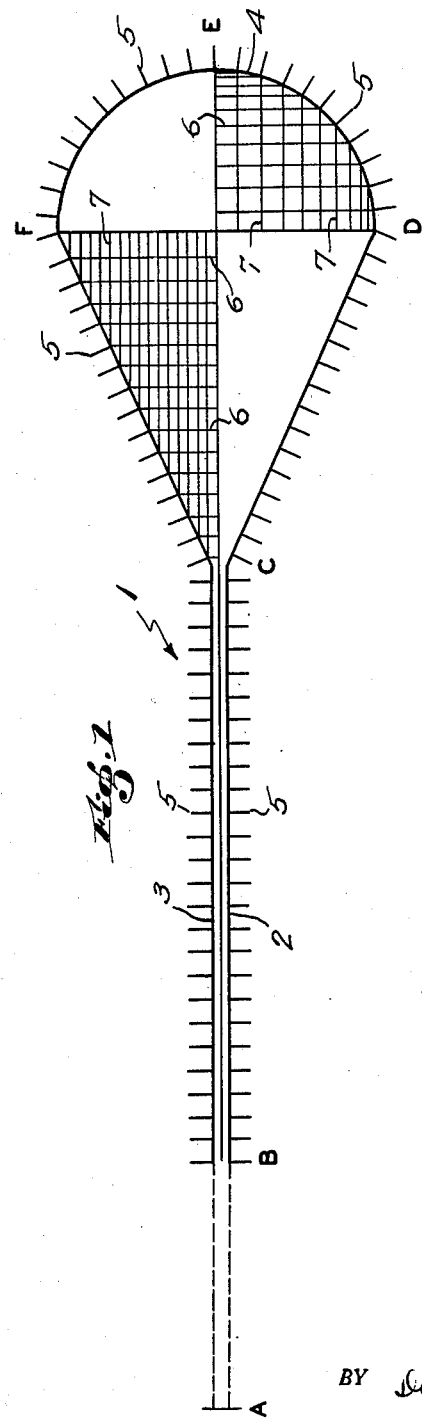
INVENTOR.
Franklin A. Reece,
BY Dike, Calver & Porter
attys

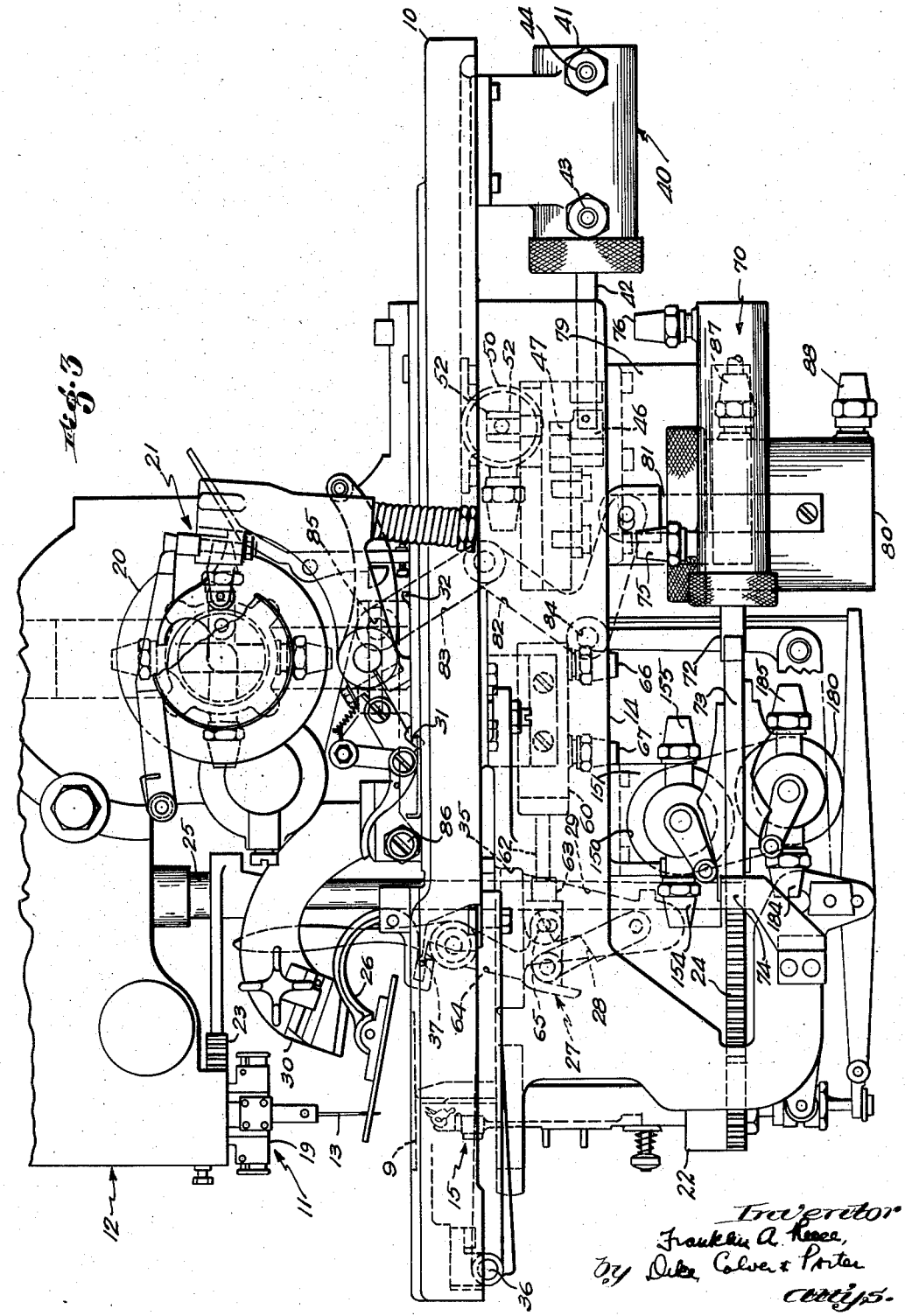

May 29, 1951 F. A. REECE 2,555,095
STITCHING MACHINE
Filed Dec. 28, 1948 11 Sheets-Sheet 4
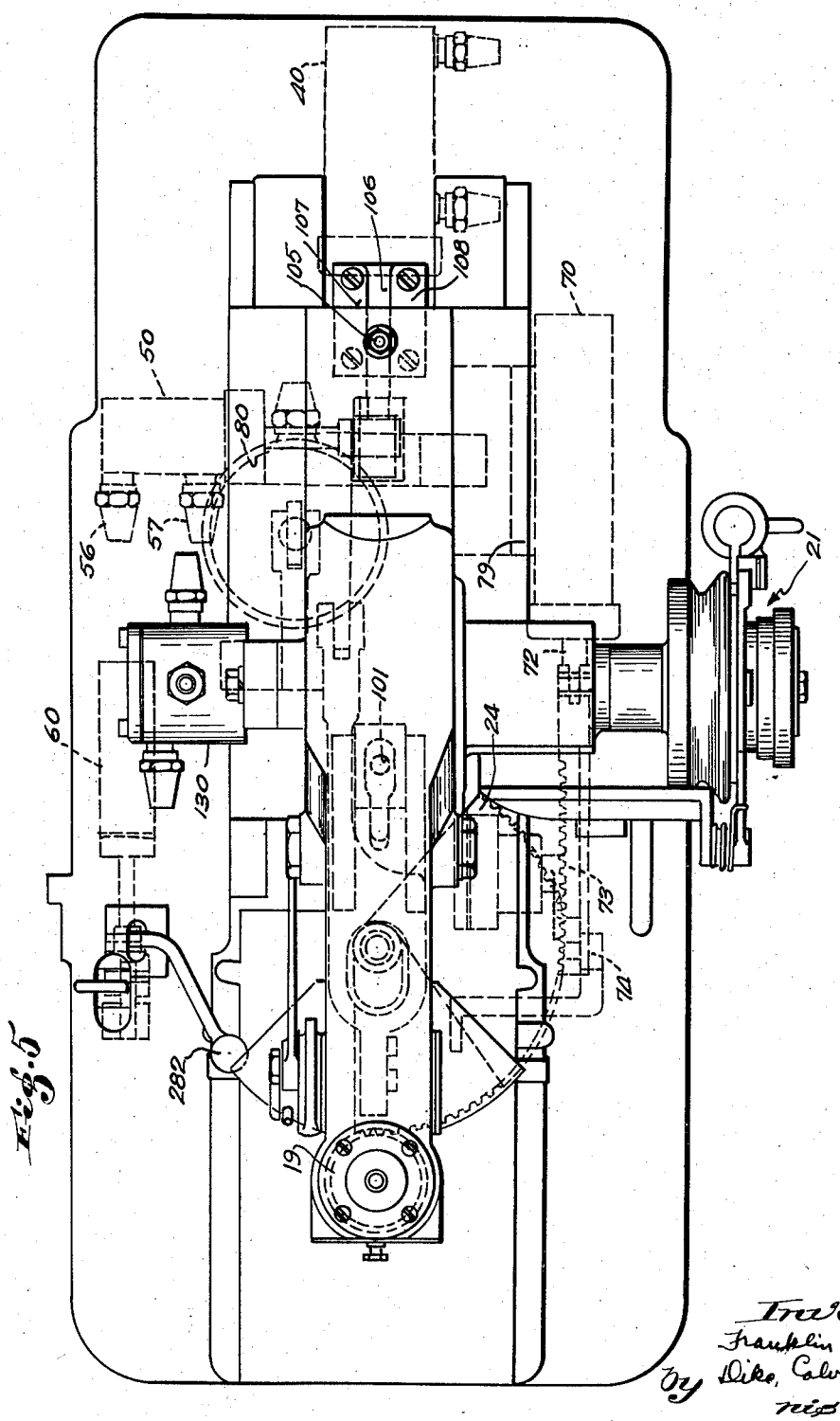

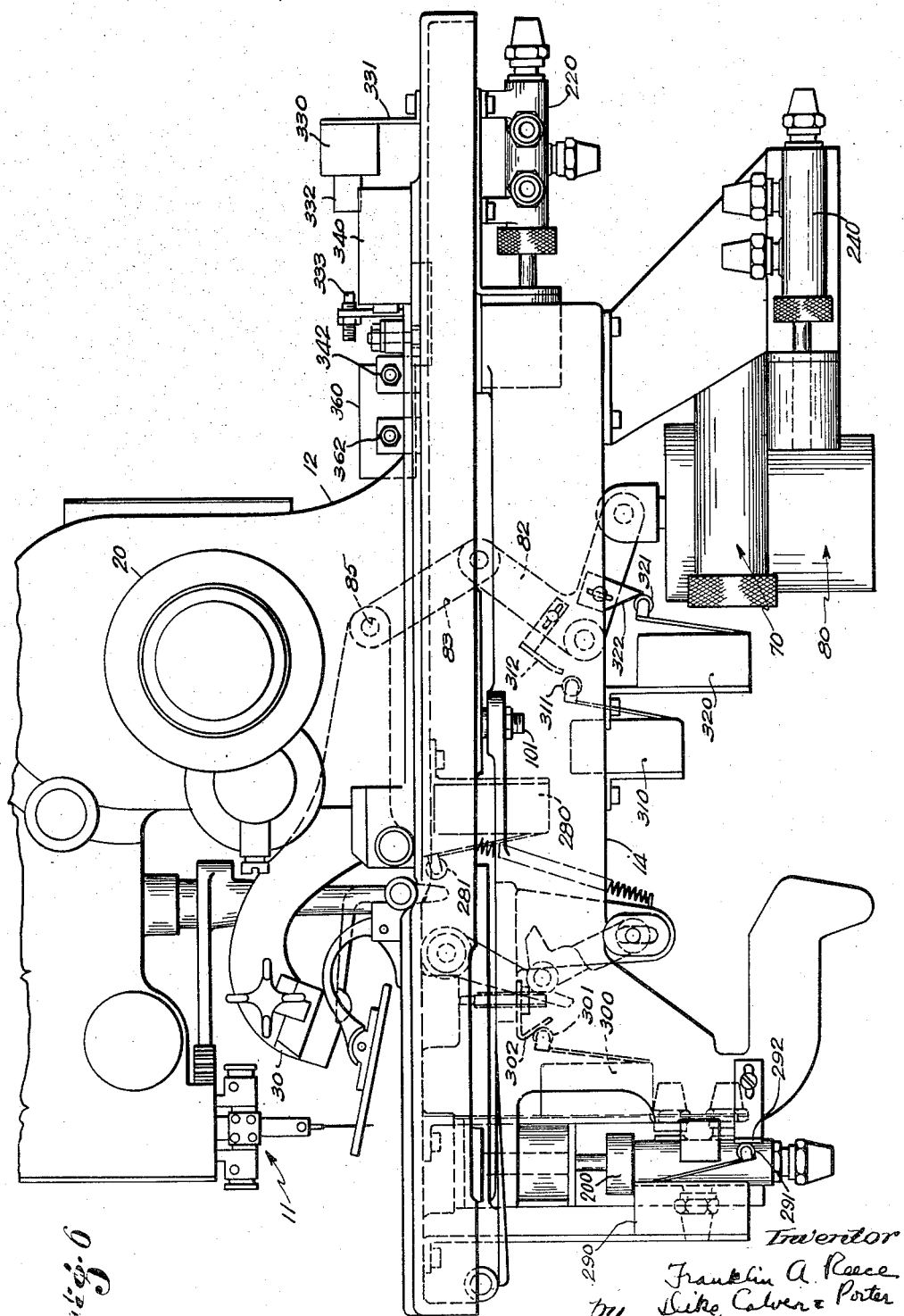

May 29, 1951 F. A. REECE 2,555,095
STITCHING MACHINE
Filed Dec. 28, 1948 11 Sheets-Sheet 6
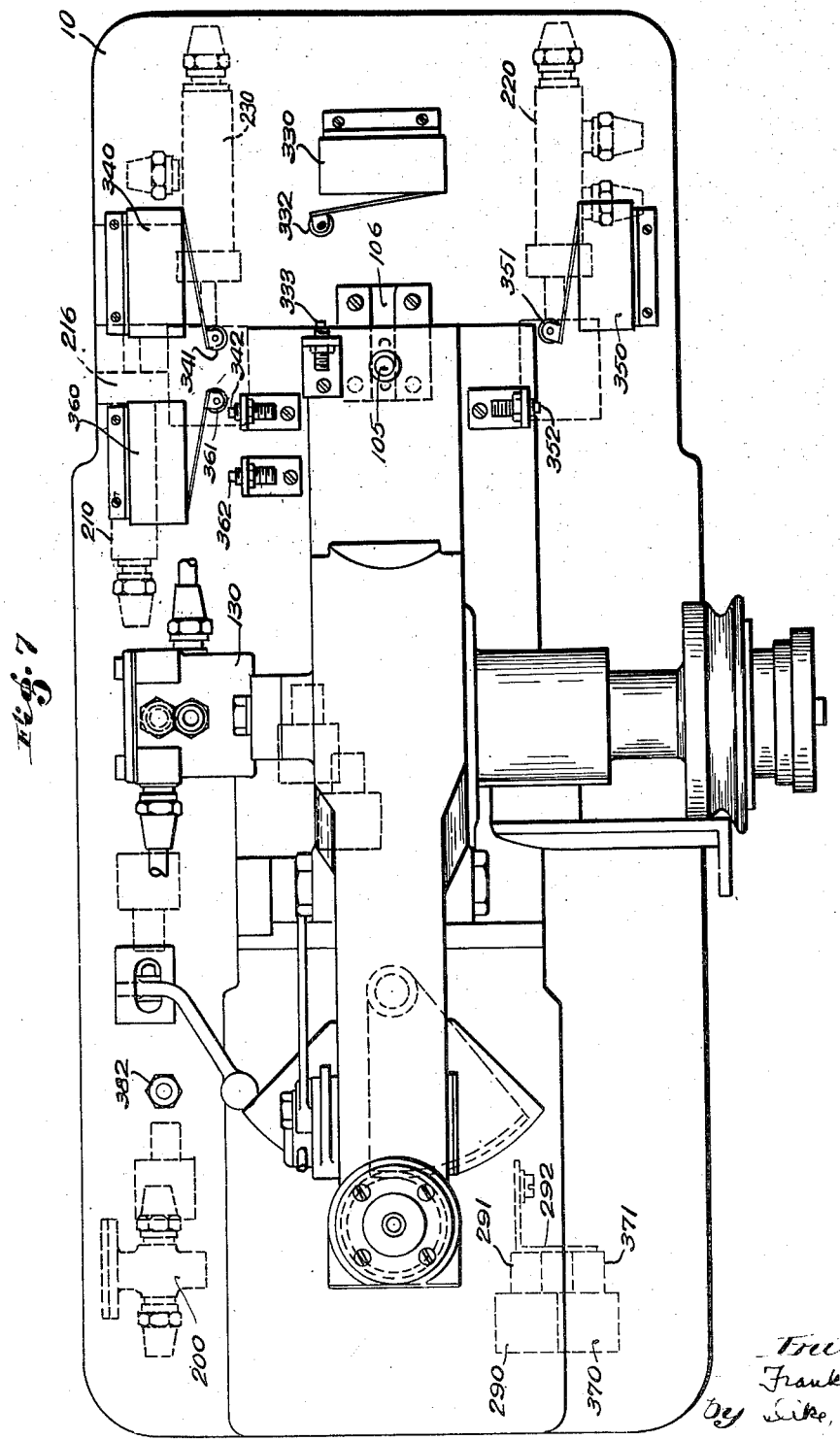

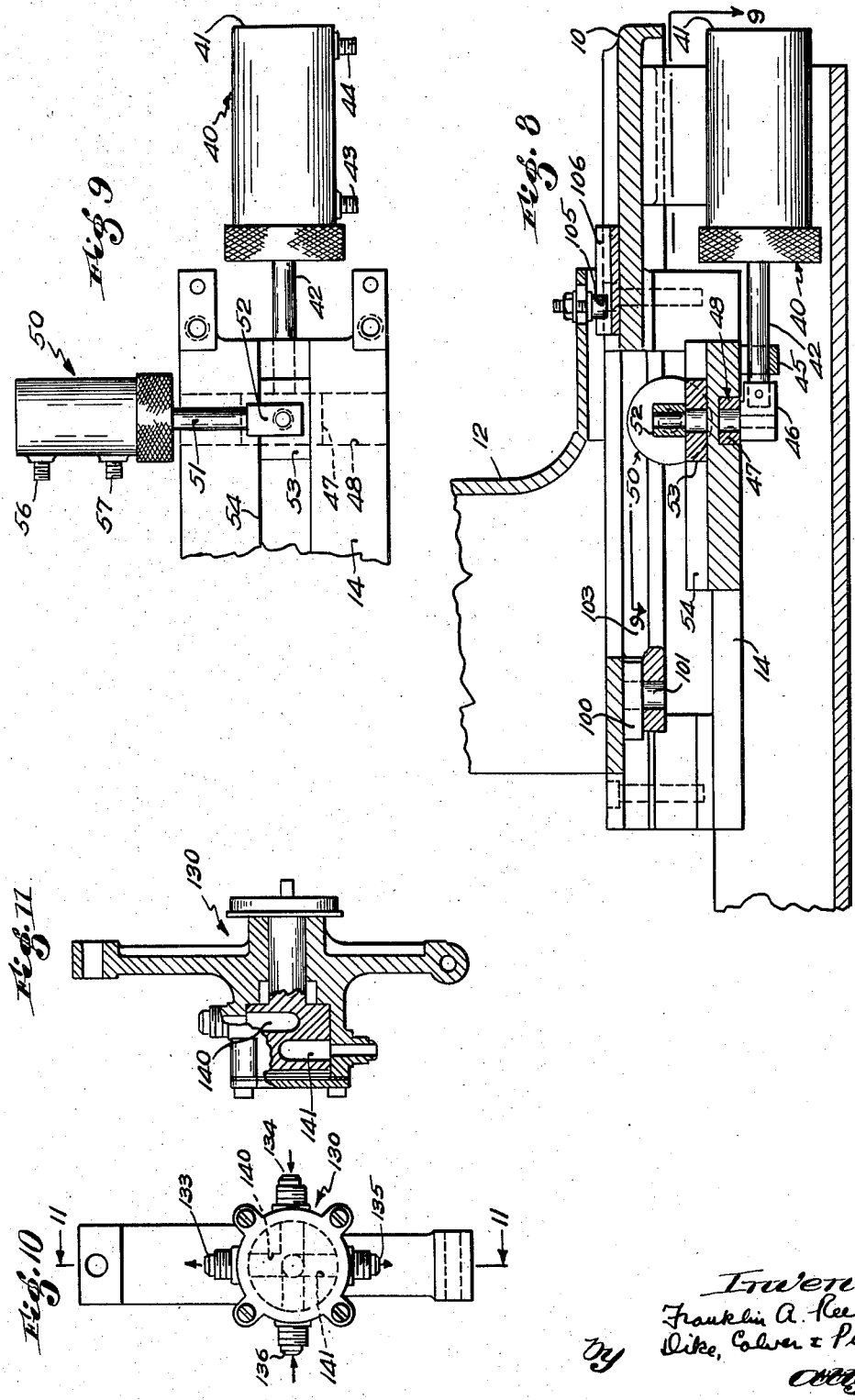

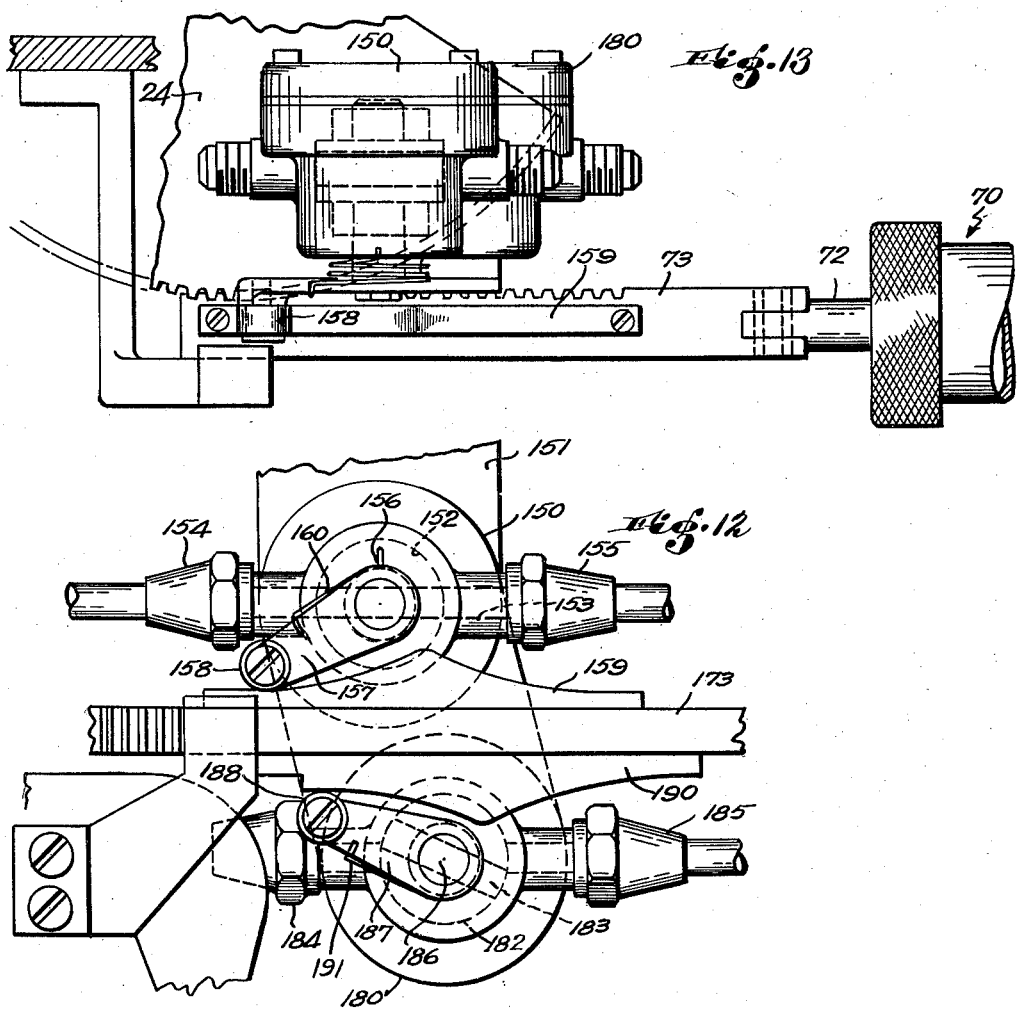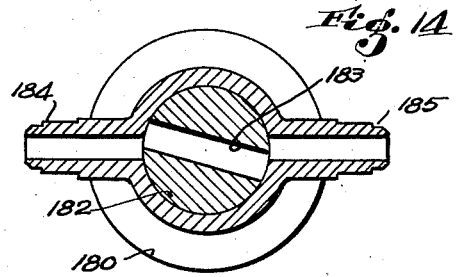

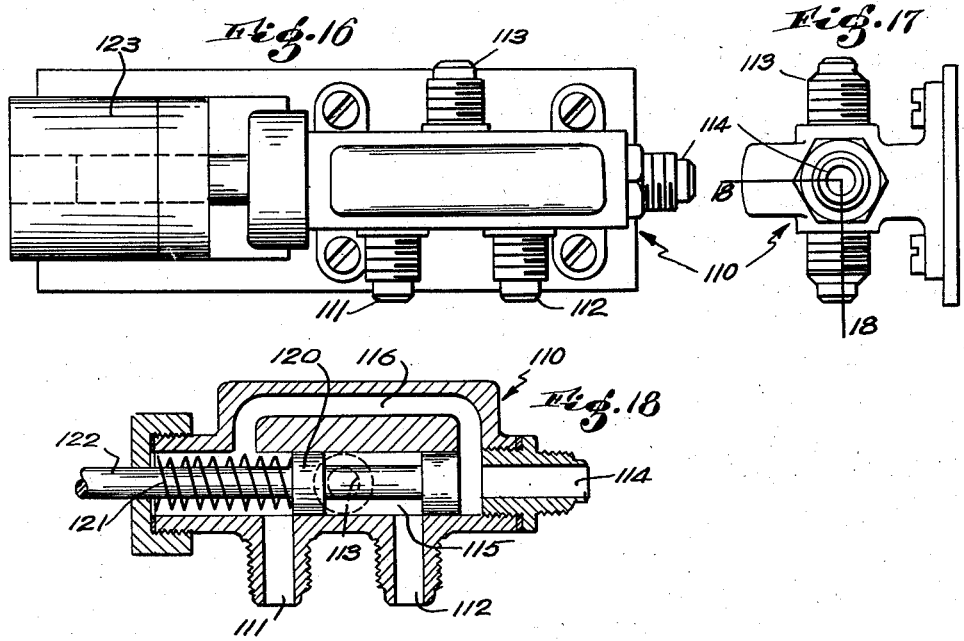
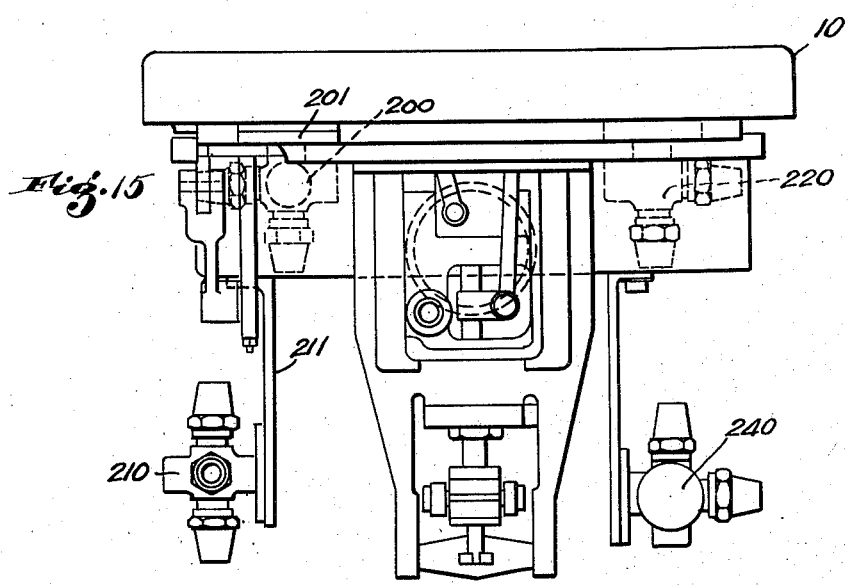

May 29, 1951 F. A. REECE 2,555,095
STITCHING MACHINE
Filed Dec. 28, 1948 11 Sheets-Sheet 10
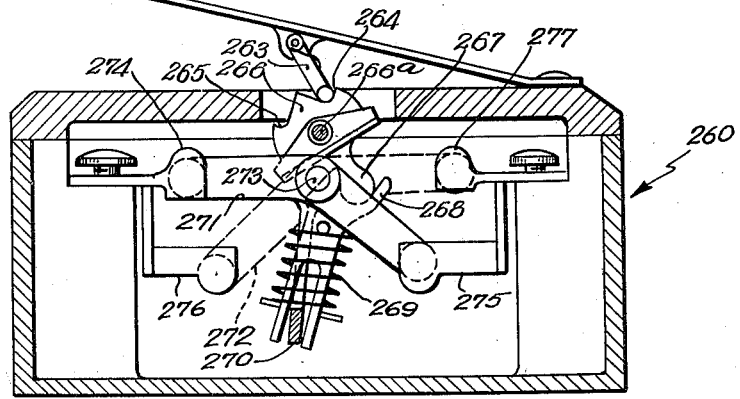
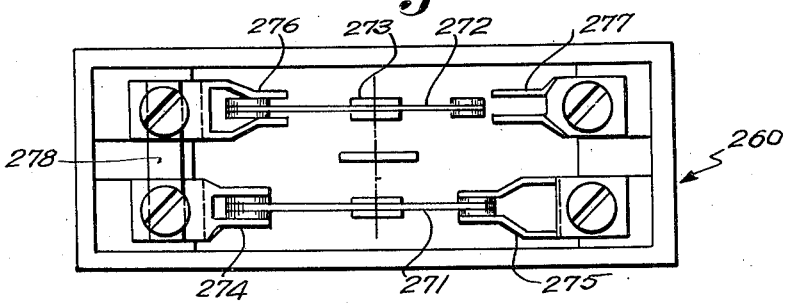
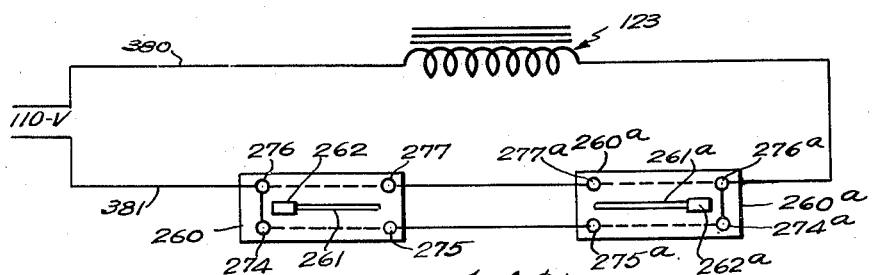
Inventor:
Franklin A. Reece
by Dike, Calvert & Porter
Attys

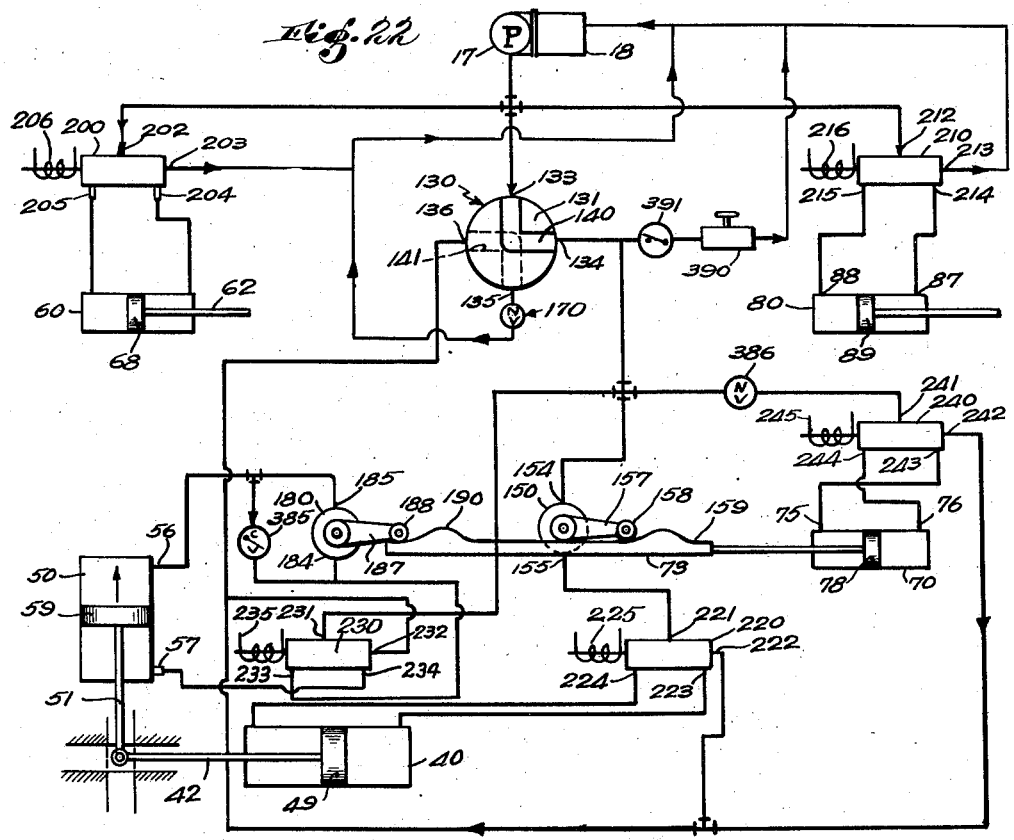
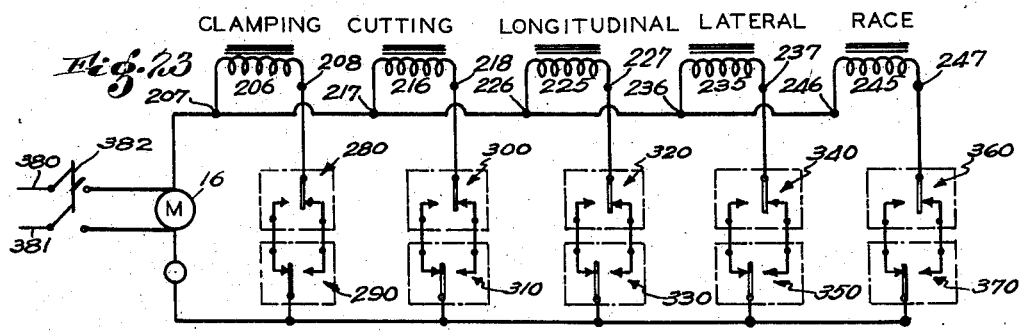

Patented May 29, 1951

2,555,095

UNITED STATES PATENT OFFICE 2,555,095

STITCHING MACHINE

Franklin A. Reece, Brookline, Mass.

Application December 28, 1948, Serial No. 67,671

24 Claims. (Cl. 112—65)

This invention relates to improvements in sewing machines.

While mechanically actuated machines for finishing buttonholes, eyelets, belt holes and other holes in fabric having stitched edges have operated satisfactorily they are necessarily complicated, and require many costly parts among which are large cams. Many of the moving parts are driven at very high speeds so that they must absorb severe stresses and shock and are subject to rapid wear. Such machines vibrate seriously and are noisy and expensive. There are limits of speed beyond which such machines cannot be driven, yet the industry requires even faster machines. The present invention provides a simpler, quieter and more economical buttonhole sewing machine.

In making buttonholes, it is essential that uniformity of distance between the stitches be positively controlled. It is desirable that the distance between the stitches be adjustable for stitch density to meet various requirements, for instance, different sizes and types of buttonholes and materials of various properties. It is often desirable, in order to preserve uniform distance between stitches and in some cases to vary it in a controlled manner, that the length of one or more components of the stitching steps or the length of the steps themselves be automatically variable during the sewing of the buttonhole, particularly with respect to predetermined parts of the buttonhole. To accomplish all of these purposes it is necessary to have the machine so constructed that the work is brought to a positive stop relative to the stitching mechanism after each stitching step during intermittent sewing feed, that the intervals of distance at which such stops occur be preadjustable for the entire buttonhole and also that the intervals of distance be variable automatically during the formation of the buttonhole. Heretofore, so far as is known to me, no machine has been constructed which provides either adjustability or variability of stitching with a positively controlled intermittent feed.

The present machine accordingly provides mechanism in which the feed steps are of a positively predetermined length, the length of the feed steps may be adjusted for the whole buttonhole and the length of the feed steps or their components in direction may be varied as required automatically during the progress of the sewing around the buttonhole. It also provides a machine which is adjustable to produce buttonholes of variable characteristics and shapes.

The machine illustrated is particularly adapted to make the eye-type of buttonhole, but machines embodying the invention may be used to make straight buttonholes, fly-bar buttonholes and eyelets, and in fact any holes in fabric or fabric-like material which have stitched edges.

In the machine embodying the present invention, operations such as clamping the work, cutting the buttonhole, feeding the stitching mechanisms longitudinally and laterally relative to the work for sewing along the edges of the buttonhole and around the eye thereof, and rotation of the stitching mechanisms for sewing around the eye are actuated by fluid under pressure. In this way it is possible to do away with many parts, particularly the expensive cams, to make a much quieter and smoother operating machine to reduce the wear, and to accomplish the objects mentioned above.

In the drawings which, with the description herein, are illustrative and not intended to limit the scope of the invention:

Fig. 1 is a diagrammatic analytical view of the general path of the needle of the machine as it stitches a buttonhole.

Fig. 2 is a diagrammatic view of the relationship between corresponding paths of the needle shown in Fig. 1, and of one of the parts of the machine and of a pivot point between them.

Fig. 3 is a side elevational view of the machine and some of its parts.

Fig. 5 is a plan view of the machine showing some of its parts.

Fig. 6 is a side elevational view similar to Fig. 3 showing some of the parts.

Fig. 7 is a plan view similar to Fig. 5 showing some of the parts.

Fig. 8 is an enlarged partial side elevational view partly in section.

Fig. 9 is a plan view taken along the lines 9—9 of Fig. 8.

Fig. 10 is a side elevational view of one of the parts.

Fig. 11 is a sectional view taken along the lines 11—11 of Fig. 10.

Fig. 12 is an enlarged partial side elevational view showing details of some of the parts.

Fig. 13 is a plan view of Fig. 12.

Fig. 14 is a sectional view of one of the parts shown in Fig. 12.

Fig. 15 is a partial front elevational view of the machine showing some of its parts.

Fig. 16 is a detailed side elevational view of one of the parts.

Fig. 17 is an end view of Fig. 16.

Fig. 18 is a longitudinal view of a section taken along the lines 18—18 of Fig. 17 and developed in a plane for convenience of illustration.

Fig. 19 is a side elevational broken away view partly in section showing the details of a typical control switch.

Fig. 20 is a plan view of Fig. 19.

Fig. 21 is a schematic view showing two of the control switches of Figures 19 and 20 in a typical solenoid control circuit.

Fig. 22 is a schematic view of the fluid pressure system and its parts.

Fig. 23 is a schematic view of the electric control circuit.

Figure 4:
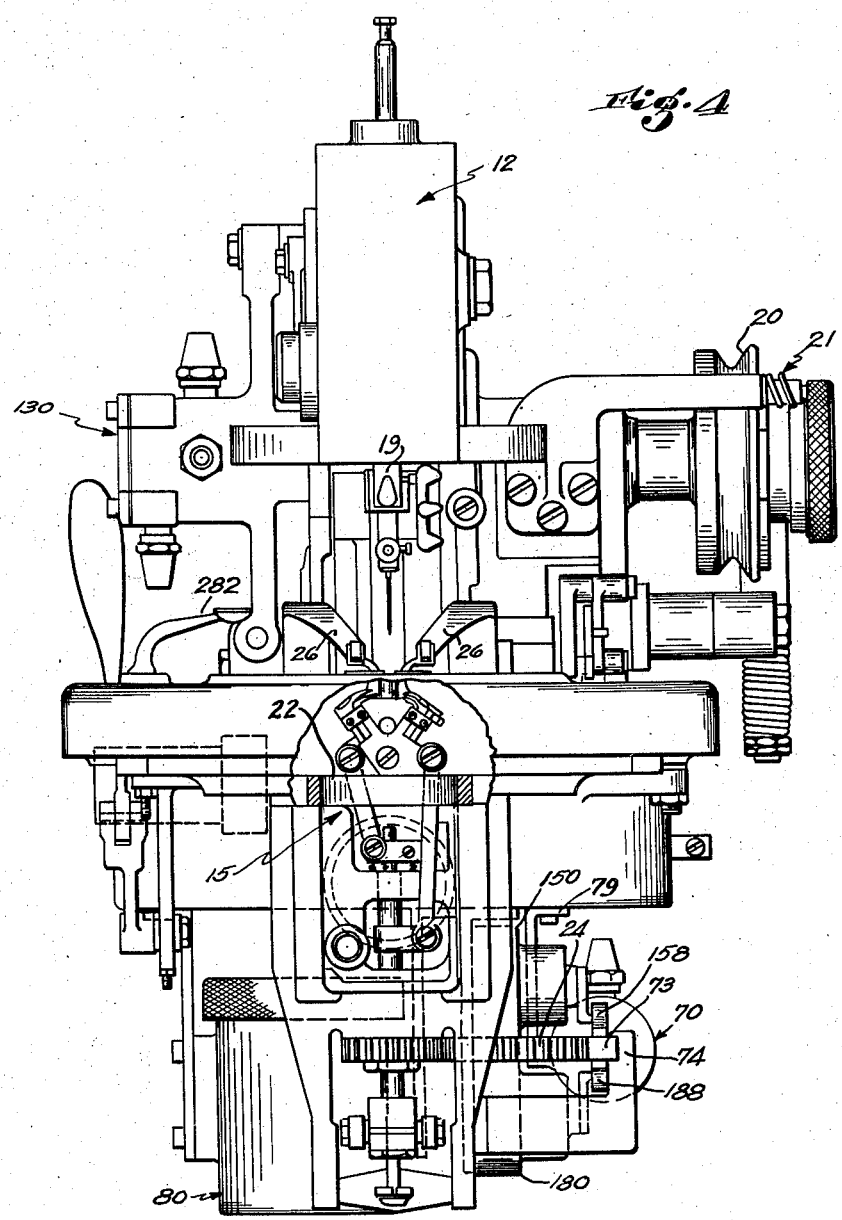
Fig. 4 is a front elevational view of the machine.

In the drawings Fig. 1 illustrates diagrammatically the stitching by the machine of the invention of a buttonhole indicated at 1. The stitching mechanisms to be described and represented by the axis of the needle move longitudinally from home position A to an adjustable stitching position B where they commence to sew along a straight edge 2 to point C. They then diverge at an angle to the first direction and sew from C to D substantially in a straight line to commence the eye 4. At D the stitching mechanisms sew a circular portion DEF and thence move in a substantially straight angular direction from F to C finishing the eye 4. Then a second straight edge 3 is stitched as the stitching mechanisms travel from C to B where sewing ceases and the stitching mechanisms return from B to home position A. Figure 2 illustrates diagrammatically the corresponding motion of one of the parts 105 of the machine located at the opposite end of a pivot point 101 from the stitching mechanisms as it moves along a path RSTUVWTSR similar in pattern but in an opposite direction to the needle path ABCDEFCBA, all of which will be described in more detail.

The machine is mounted above and below a bed plate 10 which includes a work plate 9 upon which is placed the material in which a buttonhole is to be formed (Figs. 3–8 and 15), and an upper stitching mechanism generally indicated at 11 is supported in a forwardly extending upper housing 12, and may be of the now well known type shown in patent to Kiewicz No. 1,437,847 and patent to Reece No. 1,864,218. A needle 13 reciprocates vertically through the work plate 9 and has a lateral jogging or vibrating motion normal to its path of feed or travel around the edges of the buttonhole, for forming stitches by passing the thread back and forth over the edges of a buttonhole as is usual in this type of machine. The housing 12 which supports the upper stitching mechanism 11 is connected to a lower housing 14 which supports the lower stitching mechanism 15 (Fig. 4), and both comprise a unit for supporting and enclosing the various parts of the machine which move relative to the work and which is adapted to move relative to the work plate 9 on the bed plate 10 for forming a line of stitches along the edges and around the eye of a buttonhole as will be further described. The lower stitching mechanism 15 may be of the usual double oscillating looper type shown in patent to Kiewicz No. 1,558,182. The upper and lower stitching mechanisms 11 and 15 are rotatable about a vertical axis and supported in rotatable turrets 19 and 22, Fig. 3, in the usual manner as described in the aforementioned patents, and are thus adapted to rotate for stitching around the circular portion DEF of the buttonhole eye 4 and to be positioned at one limit of rotation for stitching one edge 2 of the buttonhole while feeding in one direction relative to the work and at the opposite limit of rotation for stitching the opposite edges 3 while feeding in the other direction, Figs. 1 and 2. The stitching mechanisms 11 and 15 are cooperatively driven from a belt pulley 20 which is drivingly connected to any suitable power source such as an electric motor 16 (Fig. 23) through the usual clutch and stop mechanism indicated at 21 (Figs. 3, 4 and 5), of the type shown in patent to Hill No. 713,764 and patent to Reece No. 1,669,912 in the manner described in said patents. The clutch and stop mechanism 21 is operated by an adjustably positioned cam 31 on the bed plate 10 to engage the pulley 20 for driving the stitching mechanisms 11 and 15 when the needle 13 reaches adjustable position B to start stitching the buttonhole 1, and it is operated by a cam 32 on the bed plate 10 to disengage the pulley 20 and to stop stitching when the needle again reaches position B as it returns to home position A. The stitching mechanisms 11 and 15 include the usual thread handling means shown in the above mentioned patents, and the upper and lower stitching mechanism turrets 19 and 22 are cooperatively rotated by the usual upper and lower segmental gears 23 and 24 which are fast relative to each other and rotate together about a vertical shaft 25.

The machine has a work clamp indicated at 26 (Figs. 3 and 4), which may be locked in clamped position upon material on the work plate 9 or retracted through a toggle linkage indicated at 27, and which in some of its parts is similar to the work clamp shown in the patents to Kiewicz No. 1,841,133 and Hill No. 713,764.

A buttonhole cutter 30 (Figs. 3 and 6) is similar in function to that shown in patent to Reece No. 240,546 and its operation may be timed in the operative cycle of the machine to make it a so-called "cut before" or "cut after" machine.

A hydraulic or fluid pressure operated motor comprising a cylinder and piston and indicated at 40 (Figs. 3, 5, 8, 9 and 22) is connected to feed the upper and lower stitching mechanisms 11 and 15 and cause them to travel longitudinally of the machine relative to work held by the work clamp 26 on the work plate 9 to form stitches along the edges of the buttonhole. A similar fluid pressure operated motor 50 (Figs. 3, 5, 8, 9 and 22) feeds the stitching mechanisms in a lateral direction cooperatively with the longitudinal feed and in a resultant path for stitching around the eye 4 of the buttonhole along the path CDEFC (Fig. 1). Another fluid pressure operated motor 60 operates the work clamp 26 through the linkage 27 and a fluid pressure operated motor 70 rotates the turrets 19 and 22 of the stitching mechanisms to rotate them so that the direction of vibration or jogging of the needle 13 remains normal to its direction of feed while the machine is stitching around the circular portion DEF of the eye 4 of the buttonhole and to position them for stitching the remaining portion FCB including the edge 3 thereof in the return direction. The cutter 20 is operated by a vertically positioned fluid pressure operated motor 80. A fluid pressure system connects all of the fluid pressure operated motors to a fluid pressure pump 17 (Fig. 22) and a sump 18 supplying the pump and to which exhausted fluid is returned.

*Longitudinal feed*

Referring to Figs. 1, 3, 5, 8, 9 and 22 the stitching mechanisms 11 and 15 are moved or fed back and forth lengthwise of the machine or longitudinally relative to the buttonhole being formed to sew along its edges by fluid pressure to the fluid pressure operated motor 40 in either end of its cylinder 41 against a piston 49 therein connected to piston rod 42. The fluid enters the cylinder 41 through a fluid connection 43 and exhausts through a fluid connection 44 while the stitching mechanisms 11 and 15 are being fed in one direction, and the course of the fluid is reversed for feed in the opposite direction. The piston rod 42 is supported in a bracket 45 which is attached to the bed plate 10 and it is connected to a block 46 pivoted to a sliding block 47, which is slidable relative to the lower housing 14 in a lateral direction or normal to the direction of longitudinal feed in a slideway 48 (Fig. 8).

The unit comprising the upper and lower housings 12 and 14 is mounted slidable in any direction, except as it is guided to move relative to the bed plate 10, by any convenient means. It is guided by a block 100 pivoted in the bed plate at 101 (Figs. 2, 5 and 8). The housing 12 is slidable relative to the block 100 which rides in a slideway 103 on its underside. On the rear end of the housing 12 is fixedly mounted a cam roll 105 to slide in a groove 106 between a pair of cam plates 107 and 108 (Figs. 2, 5, 7 and 8). For the length of the groove 106, therefore, the unit comprising the upper and lower housings 12 and 14 can be moved relative to the bed plate 10 longitudinally only in a straight line as guided by the block 100 and the groove 106 during which time the stitching mechanisms 11 and 15 are moved from home position A to stitching position B, then from B to C and then back from C to A after traversing around the buttonhole eye 4.

As heretofore mentioned, Fig. 2 shows the relationship between the general path A, B, C, D, E, F, C, B, A of the needle 13 or its axis (discounting its jogging motion) as it sews around the outline of the buttonhole 1, the pivot 101 of the unit comprising the housings 12 and 14 which support the stitching mechanisms 11 and 15, and the path RSTUVWTSR of the cam roll 105 at the rear of the unit as it first moves in the groove 106 between the cam plates 107 and 108 and then leaves the groove 106 to traverse the pattern TWVUT corresponding to the buttonhole eye 4, and then re-enters the groove 106 to return to its home position S corresponding to the home position A of the needle 13. The unit of the housings 12 and 14 first moves in direct longitudinal feed before sewing commences to traverse the needle 13 from home position A to point B. Whereupon the stop mechanism and clutch 21 is actuated as described in the usual manner to engage the pulley 20 to drive the stitching mechanisms 11 and 15 whereupon sewing commences and continues until the needle 13 has traversed around the buttonhole and returned again past position B at which point sewing ceases on its way back to home position A.

The traverse by the needle 13 of the eye portion 4 of the buttonhole 1 is a resultant of both longitudinal and lateral feed.

*Lateral feed*

When the stitching mechanisms 11 and 15 are fed towards the rear of the machine until the cam roll 105 leaves the groove 106 at position T it will be apparent that the unit comprising the housings 12 and 14 can now be moved pivotally about the pivot 101 as well as in a longitudinal direction if a lateral movement is imparted to one end of the unit. A predetermined combination of simultaneous longitudinal and lateral feed will result in the travel CDEFC of the axis of the needle 13 necessary to sew around the eye of the buttonhole. For such purpose, the lateral fluid pressure operated motor 50 is adapted to move the unit pivotally or in a lateral direction while the latter is also being moved in a longitudinal direction.

Still referring to Figs. 3, 5, 8, 9 and 22, the fluid motor 50 has a piston 59 connected to a piston rod 51, one end of which is fixed to a block 52 pivoted to a sliding block 53 which is slidable relatively in a longitudinal direction in a slideway 54 in the lower housing 14. The fluid motor 50, piston rod 51, and the blocks 52 and 53 are fixed in a longitudinal direction relative to the bed plate 10, but the unit comprising the housings 12 and 14 may travel longitudinally relative to the lateral feed motor 50 and its parts because the block 53 is slidable in the slideway 54 relative to the unit. Fluid enters one end of the motor 50 and exhausts on the opposite side of the piston 59 therein by means of the fluid connections 56 and 57 (Figs. 5, 9 and 22) and reversal of the direction of fluid flow through these connections reverses the direction of lateral feed.

*Work clamp*

Some of the operative parts of the work clamp 26 are of the usual type and the clamp is connected to its operative toggle linkage 27 in the usual manner Fig. 3 according to the aforementioned patents to Hill No. 713,764, and Kiewicz No. 1,841,133. The toggle linkage 27 includes the usual lower link 28 which is operatively connected to the upper lever 64 and to the lower portion 29 of the usual yoke 35 which is pivoted at 36 and has the usual hooks 37 for engaging the clamp 26.

The fluid pressure operated motor 60 for the work clamp 26 has a piston 68 (Fig. 22), connected to a piston rod 62 which is supported in a bracket 63 attached to the bed plate 10. The piston rod 62 is operatively connected to the upper toggle lever 64 as by a pin 65 (Fig. 3). Fluid pressure entering one and exhausting from the other of the two fluid connections 66 and 67 is operative to move the piston rod 62 to the right which moves the clamp 26 down once during the operative cycle of the machine to secure the material in which a buttonhole is to be formed. Reversal of fluid pressure flow unclamps the material.

*Cutter*

The buttonhole cutter 30 (Figs. 3 and 6) is actuated once during the operative cycle of the machine by the fluid pressure operated motor 80 through a piston 89 (Fig. 22) connected to a piston rod 81 and thence to the cutter 30 through a bell crank lever 82 and a link 83. The bell crank arm 82 is pivoted to a bracket under the bed plate 10 at 84 and its upper arm and the link 83 forms a toggle. The upper end of the link 83 is pivoted at 85 to one end of the cutter lever 30 which is itself pivoted at 86. Fluid pressure is reversibly introduced and exhausted in the cylinder 80 through the fluid connections 87 and 88.

*Turret drive*

Referring to Figs. 3, 4, 5, 12, 13 and 22 the upper and lower turrets 19 and 22 for rotating the stitching mechanisms 11 and 15 are rotated by the fluid motor 70 through a piston 78, connected to a piston rod 72 and a rack 73 which engages the gear 24. The rack 73 is supported in a bracket 74 on the lower housing 14. Fluid pressure is introduced and exhausted in the motor 70 through the fluid connections 75 and 76. The fluid motor 70 is supported to travel with the housing 14 by a bracket 79.

*Fluid pressure control—general*

In the buttonhole 1 illustrated in Fig. 1 the stitching steps or resulting increments of feed of the stitching mechanism along the edges of the buttonhole are represented by the lines 5 and the distances between these lines represent the amounts by which the stitching mechanisms are moved between stitches, the distances being exaggerated in the figure for purposes of simplicity and clarity.

In the straight portions 2 and 3 of the buttonhole between B and C, the distances between the lines 5 are equal to the steps in the increments of longitudinal feed and to each other. In these portions there is no lateral feed component. In the eye 4 of the buttonhole including all of its portions to the right of C, the lines 6 represent increments of the components of longitudinal feed and the lines 7 represent increments of the components of lateral feed which produce the resultant steps 5.

It will thus be seen that in the substantially straight portions of the eye 4, that is from C to D and from F to C, the distances between the stitching increments 5 or length of stitching steps are the resultants of the longitudinal feed component increments 6 and of the lateral feed component increments 7 and that they are also equal to each other or constant since in these eye portions (C—D and F—C) the lengths of or distances between the longitudinal components 6 are equivalent or constant and the same is true of the lateral components 7. The stitching increments 5 in these portions C—D and F—C are therefore slightly larger than the increments 5 in the straight portions 2 and 3 (B—C), because each is the hypotenuse of a triangle formed by itself 5, a longitudinal component 6 and lateral component 7.

In the circular portion DEF of the eye 4, the stitching increments 5 or length of stitching steps are arbitrarily predetermined as constantly equivalent and for convenience at an increment whose length or step is equal to that in the portions C—D and F—C. It will then be seen that as the stitching mechanisms progress from D to E, the longitudinal increments 6, must decrease approaching point E and that the lateral increments 7, starting at a minimum at point D, must increase and reach a maximum at point E and then decrease to reach their minimum again at point F. As the stitching mechanisms return toward home position A from point F, the longitudinal and lateral components again become constant, the lateral components ceasing at point C, and until sewing ceases at B.

Provision is made for controlling the flow of fluid in the machine automatically for determining the direction of longitudinal and lateral feed of the stitching mechanisms 11 and 15, for imparting to them a step by step or intermittent stitching feed and for progressively varying the length of the longitudinal and lateral component increments or steps as necessary to produce the constantly equivalent resultant increments 5.

The direction of movement of the fluid pressure operated motors in the machine is controlled so that they operate in timed sequential relation to perform their functions in the operative cycle of the machine by a series of solenoid operated valves controlling the direction of flow of fluid pressure to them through fluid pressure lines from the pump 17 and the solenoids of the latter valves are in turn controlled by an electrical system including limit switches which are mechanically actuated in timed succession as the operative cycle progresses.

An intermittent flow of fluid to the longitudinal and lateral feed motors 40 and 50 and to the turret rotating motor 70 is imparted by an intermittently opening cut-off valve 130 (Figs. 5, 7, 10, 11 and 22) to provide the step by step or intermittent feed for the stitching mechanisms 11 and 15 during sewing, and the valve 130 is otherwise normally open during straight longitudinal feed of the stitching mechanisms 11 and 15 from home position A to B where sewing commences and during their return from B to home position A after sewing ceases as will be further described. The cut-off valve 130 controls the amount of fluid exhausted from the motors 40 and 50 as well as the amount admitted to them for each stitching step so that the motors cannot over-run or move by inertia further than they have been moved by pressure, thus providing a positively controlled intermittent stitching feed.

A pair of metering valves 150 and 160 (Figs. 3, 4, 5, 12, 13, 14 and 22) automatically vary the length of the successive intermittent steps 6 and 7 of both longitudinal and lateral feed to produce the desired resultant travel of the needle 13 during each resultant step 5 around the circular portion DEF of the buttonhole eye. These metering valves are responsive to the motion of the rack 73 produced by the fluid motor 70 as will be further described.

A manually pre-adjusted needle or metering valve 170 (Fig. 22) is provided in the exhaust line between the intermittent valve 130 and the sump 18 by which the length of all the stitching steps 6 and 7 and, therefore, the stitch density may be predetermined.

A. *Solenoid operated reversing valves*

Each fluid motor has a corresponding solenoid operated valve which in one position allows fluid to drive its piston in one direction and in the other position allows the direction of fluid flow to be reversed to drive the piston in the opposite direction. A typical solenoid operated control valve is illustrated in Figs. 16, 17 and 18 at 110. It has four fluid connections 111, 112, 113 and 114 respectively entering a chamber 115 the opposite ends of which are interconnected by a passage 116. A valve plunger 120 in the chamber 115 is normally urged in one direction by a spring 121 and its is connected by a shaft 122 to the typical solenoid 123 so that when the solenoid is deenergized the valve plunger 120 is in the position shown to the right as in Fig. 18 and when the solenoid is energized the plunger 120 moves to the left. In its position to the right the connections 111 and 114 are interconnected and the connections 113 and 112 are interconnected. When the solenoid is energized to move the plunger 120 to the left the connections 111 and 113 are interconnected and the connections 112 and 114 are interconnected.

The relative locations of the solenoids and valves on the machine which control the direction of flow of fluid to the various fluid motors is shown in Figs. 6, 7 and 15 (see also Fig. 22) as follows: A solenoid operated valve 200 associated with the clamping fluid motor 60 is connected to the bed plate 10 as by a bracket 201 and has fluid connections 202, 203, 204 and 205 and an operating solenoid 206 and it is connected to control the direction of flow in the clamping fluid motor 60. A valve 210 controlling the flow of fluid through the cutting cylinder 80 is attached to the bed plate conveniently by a bracket 211 and has fluid connections 212, 213, 214 and 215. The valve 210 is operated by a solenoid 216. The longitudinal feed cylinder 40 is controlled by the solenoid operated valve 220 attached to the bed plate 10 having the fluid connections 221, 222, 223 and 224 and an operating solenoid 225. The lateral feed fluid motor 50 is controlled by a valve 230 (Fig. 7) which has fluid connections 231, 232, 233, 234 and is operated by a solenoid 235. A valve 240 controls rotation of the turrets 19 and 22 of the upper and lower stitching mechanisms 11 and 15 and has connections 241, 242, 243 and 244 and it is operated by a solenoid 245.

B. *Intermittent cut-off valve*

When the intermittent stitching feed cut-off valve 130 (Figs. 4, 5, 7, 10, 11 and 22) is operative for direct feed except during sewing, that is from A to B and from B to A, it remains open in the position shown in Figs. 10 and 22 allowing fluid under pressure to flow uninterruptedly to operate the longitudinal and lateral feed fluid motors 40 and 50 and the turret motor 70 and to allow exhaust fluid from them to return to the sump 18. It is mounted on the housing 12 and it has a rotor 131 which is drivingly connected through the stitching mechanism drive in any convenient manner to the pulley 20 by way of the clutch and stop mechanism 21 so that it rotates for intermittent operation when the stitching mechanisms 11 and 15 are in operation and in time with them. The valve 130 has fluid connections 133, 134, 135 and 136 respectively. Its rotor 131 has two right angle passages 140 and 141 respectively which are offset from each other and not interconnected so that when the rotor 131 is in the position shown the fluid connections 133 and 134 are interconnected and the connections 135 and 136 are interconnected. In certain positions of the rotor 131 no fluid either pressure or exhaust can flow through the valve 130. When the rotor 131 is driven by the pulley 20, fluid flows intermittently between the passages 133 and 134 for pressure and 135 and 136 for exhaust respectively as the respective passages 140 and 141 are positioned opposite them, and a timed step by step or intermittent stitching feed is imparted to the stitching mechanisms 11 and 15. As fluid under pressure passes between the passages 133 and 134, an equal amount of exhaust fluid passes between the passages 135 and 136 allowing the motors being driven to move under pressure a predetermined amount and no more. When pressure is cut off, exhaust is cut off also, thus providing a positively controlled step by step feed in which means are provided limiting positively the extent of the movement of the moving part between stitches and by it is brought to a positive stop and held stationary between stitching steps to give the needle an opportunity to penetrate and ascend from the work without any overrunning movement of the feed motion. By adjustment of the exhaust fluid needle valve 170, the stitch density may be pre-adjusted for the distance desired between stitches, and because of the positive stop action of the intermittent valve 130 after each stitching step, the distance between stitches or stitch density remains the same for all speeds of operation of the machine for any chosen stitch density adjustment of the needle valve 170 and no overrunning of the driven part occurs which would otherwise make the density uncontrollably variable.

C. *Longitudinal and lateral feed metering valves*

In order to produce the circular travel DEF of the needle 13 around the eye 4 of the buttonhole 1 being sewn during the intermittent stitching feed, it has been previously indicated that it is necessary to vary the flow of fluid through the longitudinal feed fluid motor 40 and the lateral feed fluid motor 50 in order to produce the longitudinal and lateral increments 6 and 7 of varying lengths, Fig. 1.

For this purpose the longitudinal feed metering valve 150 (Figs. 3, 4, 5, 12, 13, 14 and 22) is mounted as by a bracket 151 under the lower housing 14. It has a rotor 152 with a passage therein 153 interconnecting two fluid connections 154 and 155 by which the valve is placed in the fluid pressure line from the pump 17 to the longitudinal feed motor 40 when the valve 150 is normally open as shown in Fig. 12. The rotor 152 is fast on a shaft 156 to which is attached an arm 157 outside of the valve 150 with a cam roll 158 on its end which rides on a cam 159 mounted on the turret actuating rack 73. A spring 160 holds the cam roll 158 against the surface of the cam 159. When the low portion of the cam 159 is under the roll 158 the valve 150 is wide open and when the high point of the cam 159 is under the roll 158 the valve 150 is partially closed between the fluid connections 154, 155. Movement of the cam 159 under the roll 158 progressively closes the valve 150 and diminishes the increment of the longitudinal components of feed 6 (Fig. 1) as the needle approaches from D to E, and opens the valve to increase them again as the needle moves away from E toward F.

A similar metering valve 180 in the fluid pressure line to the lateral feed motor 50 is mounted under the lower housing 14 as by the bracket 151. It has a rotor 182 with a passage 183 which is normally positioned so that a relatively small amount of fluid under pressure can pass between the fluid connections 184 and 185 through the valve 180. The rotor 182 is mounted on a shaft 186 which has fast on its outside end an arm 187 with a cam roll 188 on its end riding on a cam 190 attached to the underside of the rack 73. When the roll 188, which is pressed against the cam 190 by a spring 191, is on the low part of the cam 190 the valve 180 is normally partially closed and when the cam roll 188 is on the high point of the cam 190 the valve 180 is wide open. Fig. 14 shows the normal position of the rotor 182 in the valve 180. Movement of the cam 190 under the roll 188 progressively opens the valve 180 and increases the increments of the lateral components of feed 7 (Fig. 1) as the needle approaches E from D and closes the valve again to decrease them as the needle moves away from E toward F.

D. *Electric solenoid control switches and circuits*

Referring to Figs. 6, 7, 19, 20, 21 and 23, each of the solenoids 206, 216, 225, 235 and 245 for operating the fluid control valves 200, 210, 220, 230 and 240 respectively is energized and de-energized successively by each of a pair of limit switches which are so connected in the electrical circuit (Figs. 21 and 23) that when one switch of a pair is actuated the solenoid is always energized and when the other switch of a pair is actuated the same solenoid is always deenergized, thus positioning the respective valves to control the direction of fluid flow into the various fluid motors 40, 50, 60, 70 and 80 in timed sequential relation according to the requirements of the operative cycle of the machine. The limit switches for accomplishing the aforementioned purposes are all identical in structure and a typical switch is generally indicated at 260 and 260a in Figs. 19, 20 and 21.

Such a switch 260 has an actuating spring arm 261 which yieldably holds itself in the position shown and has a contact roll 262 where a mechanical force may be applied to move the arm downwardly as viewed in Fig. 19. Pivotally attached to the arm 261 and yieldingly maintained by springs in a straight up and down position is a pawl 263 adapted to insert itself alternately in each of a pair of notches 264 and 265 in an oscillatable ratchet 266 pivoted at 266a. The ratchet 266 has a tongue 267 fitting in a yoke 268 which is urged upwardly against it by a spring 269 pressing against the lower arm 270 of a pair of oscillatable electric contact switch knives 271 and 272 pivoted at 273. The switch 260 has four fixed terminal contacts 274, 275, 276 and 277, respectively, which are selectively engaged by the switch knives 271 and 272 to establish electric contact across them. The contacts 274 and 276 are permanently interconnected by an electric conductor 278. When the knives 271 and 272 are in the position shown in Fig. 19, the knife 271 interconnects the terminal contacts 274 and 275 and the knife 272 is open, that is, not in any electric contact. When the arm 261 is actuated downwardly, the pawl 263 pressing in the notch 264 rotates the ratchet 266 clockwise as viewed, throws the tongue 267 and top of the yoke 268 to the left against the spring 269 and the lower arm 270 is thrown in a toggling action to the right thus oscillating the knives 271 and 272 in a counterclockwise direction to the dotted line position. The knife 271 breaks its contact with the fixed terminal contacts 274 and 275 and the knife 272 makes contact with and interconnects the fixed terminal contacts 276 and 277. When the actuating force is withdrawn from the arm 261 it springs back, withdrawing the pawl 263 from the notch 264. The ratchet 266 has been moved to the right or clockwise so that the notch 265 is now presented to the pawl 263. Therefore, when the arm 261 is again actuated, the pawl enters the notch 265, moves the ratchet 266 counterclockwise and back to its original position as shown, and reverses the movement of the knives 271 and 272 to their original position as shown in Fig. 19.

A typical circuit including the typical solenoid 123 and a pair of typical control switches 260 and 260a for controlling it is shown in Fig. 21. One power line 380 of a suitable electric power source is connected in series through the solenoid 123 to the terminal 276a of the switch 260a. The other power line 381 is connected to the terminal 276 of the switch 260. The terminals 275 and 275a and 277 and 277a are respectively interconnected. Assuming that the switch 260 is used to energize the solenoid 123 and the switch 260a is used to deenergize it, when the solenoid is deenergized the switches 260 and 260a are in such condition with respect to each other that if the terminals 274 and 275 are interconnected, then the terminals 274a and 275a are open or disconnected (or vice versa). In this condition of the switches 260 and 260a, then, the terminals 276 and 277 are open or disconnected and the terminals 276a and 277a are connected (or vice versa). Then, when the arm 261 of the switch 260 is operated to energize the solenoid 123, the terminals 276 and 277 become interconnected and an energizing circuit is established through the solenoid 123 between the power lines 380 and 381 through the terminals 276, 277, 277a and 276a all of which are interconnected, the others being open. When the arm 261a of the switch 260a is operated to deenergize the solenoid 123 the circuit is broken across the terminals 276a and 277a and the terminals 274a and 275a become interconnected and ready for the next energization of the solenoid 123 when the switch arm 261 is again operated to interconnect the terminals 274 and 275 which were disconnected when the arm 261 was first operated.

The limit switches 260 and 260a and their circuit as described and illustrated in Figs. 19, 20 and 21 are typical of all of the following particularly described control switches and solenoid circuits in the machine and which are illustrated in Figs. 6, 7 and 23.

A limit switch 280 is adapted to operate the work clamp 26 by energizing its solenoid 206 and is mounted under the bed plate 10 so that its arm 281 is conveniently engaged by the lower end of a starting handle 282 pivotally mounted for manual operation above the bed plate 10. When the starting handle 282 is depressed by the operator the operative cycle commences. A limit switch 290 attached under the bed plate 10 is paired with the switch 280 and is operative to deenergize the solenoid 206 and release the work clamp 26 at the end of the operative cycle of the machine when the stitching mechanisms 11 and 15 return to their home position. It has an arm 291 which is actuated by an adjustably positioned plate 292 carried on the lower housing 14. When the plate 292 engages the arm 291 the clamping solenoid 206 is deenergized.

As previously stated, the machine illustrated is a so-called "cut before" machine in which the cutter 30 functions to cut a hole for the buttonhole in the material immediately after the work is clamped in the machine and before stitching of the buttonhole commences. By rearrangement of the timing of the operation of the control switches the machine can also be made to function as a "cut after" machine in which the cutter 30 operates after the buttonhole has been stitched.

A limit switch 300 for energizing the cutter solenoid 216 and operating the cutter 30 and attached under the bed plate 10 has an arm 301 which is engaged by a cam 302 attached to the clamping yoke 35 and which moves with it downwardly when the work clamp 26 is operated at the beginning of the operative cycle and at the end of the operative stroke of the work clamp piston 62. The solenoid 216 is deenergized to retract the cutter 30 at the end of the latter's operative stroke by a limit switch 310, paired with the switch 300 and having an arm 311 engaged by a shoe 312 attached to the bell crank arm 82 in the cutter mechanism linkage and so positioned that the arm 311 is engaged to deenergize the cutting solenoid 216 at the instant the operative stroke of the cutter 30 is completed.

The solenoid 225 is energized to commence longitudinal feed of the stitching mechanisms 11 and 15 by the actuation of a switch 320 which has an arm 321 engaged by a cam 322 attached to the bell crank arm 82 in the cutter linkage. The cam 322 engages the arm 321 upon the return of the cutter 30 to its inoperative position. The longitudinal feed solenoid 225 is deenergized when the need reaches position E to return the stitching mechanisms 11 and 15 to their home position A by a switch 330 paired with the switch 320 and attached by a bracket 331 to the top of the bed plate 10 at its rear. The switch 330 has an arm 332 which is engaged when the needle reaches E by an adjustably mounted set screw 333 mounted on the rear end of the upper housing 12.

It will be recalled that the lateral feed motor piston 59 is continually urged by fluid pressure upwardly or in the direction of the arrow (Fig. 22) while the lateral feed solenoid 235 is deenergized but that no lateral movement takes place until the cam roll 105 leaves the groove 106 when lateral movement commences as the needle moves from C to D.

The lateral feed solenoid 235 is energized to reverse the direction of lateral feed when the needle reaches D by a limit switch 340 mounted on the top of the bed plate 10 and having an arm 341 which is engaged by an adjustably mounted set screw 342 on the rear of the upper housing 12. The solenoid 235 is deenergized to reverse the direction of lateral feed in the other direction when the needle reaches F to return the guide roll 105 to its groove 106 during the last stage F—C or W—T of sewing the eye 4 by a limit switch 350 on top of the bed plate 10 paired with the switch 340 and which has an arm 351 operatively engaged by a set screw 352 adjustably mounted on the moving housing 12.

The solenoid 245 for actuating the turrets 19 and 22 of the stitching mechanisms 11 and 15 to rotate them for sewing around the circular eye portion DEF is energized by a limit switch 360 on the rear of the bed plate 10 which has an arm 361 engaged by a set screw 362 when the needle reaches D. The stitching mechanism turrets 19 and 22 are progressively reversed by intermittent steps timed with the stitching steps as the machine sews around the portion DEF and remain in full reverse position thereafter during the return of the stitching mechanisms to their home position A. The solenoid 245 is then deenergized to reverse and reposition the stitching turrets for a new cycle by a limit switch 370 under the bed plate 10 near the front of the machine and paired with the switch 290. The switch 370 has an arm 371 which is engaged by the bracket 292 which also actuates the switch 290 for releasing the work clamp 26.

The various solenoid control switches are connected in pairs as illustrated in Fig. 23 and similarly to the pair of typical solenoid energizing and deenergizing switches 260 and 260a heretofore described in detail and shown in Figs. 19, 20 and 21. Each solenoid is connected in series with its respective pair of control switches across the main power lines 380 and 381, and the solenoid circuits are in parallel with respect to each other. Thus, referring to Fig. 23, the clamping solenoid 206 is connected at 207 with the line 380 and at 208 through its energizing and deenergizing switches 280 and 290 with the power line 381. The cutting solenoid 216 is connected at 217 with the line 380 and at 218 through its control switches 300 and 310 with the line 381. The longitudinal feed solenoid 225 is connected at 226 with the line 380 and at 227 through its control switches 320 and 330 with the line 381. The lateral feed solenoid 235 is connected at 236 with the line 380 and at 237 through its control switches 340 and 350 with the line 381. The turret control solenoid 245 is connected at 246 with the line 380 and at 247 through its control switches 360 and 370 with the line 381.

*Fluid pressure system*

The fluid pressure system and its branches supplying fluid under pressure to the various fluid pressure motors is best illustrated in Fig. 22. Fluid pressure is generated by the pump 17 which in turn may be driven from the drive motor 16. The pump 17 is preferably a constant pressure pump with a fluid supply from and exhaust to the sump 18.

When the pump 17 is running, fluid pressure flows to the connection 202 in the solenoid operated clamping valve 200. When the solenoid 206 is energized the connections 202 and 205 are interconnected in the valve 200 allowing fluid pressure to the left side of the piston 68 to move it to the right to move the work clamp 26 to the clamping position and fluid is exhausted from the right hand side to the connections 204 and 203 and thence back to the sump. When its operating solenoid 206 is deenergized the connections 202 and 204 are interconnected to allow pressure to the right side of the piston 68 as shown in the figure, moving it to the left for unclamping position. Fluid is exhausted from the left side of the piston 68 through the connection 205 to the connection 203 in the valve 200 and thence back to the sump 18.

Fluid pressure is supplied to the solenoid operated cutter valve 210 controlling the flow of fluid to the cutter cylinder 80 at the connection 212. When the cutter solenoid 216 is energized fluid flows through the valve 210 from the connection 212 to the connection 215 and thence to the left side of the piston 89 in the position shown to move it to the right to operate the cutter 30. Fluid is exhausted from the right hand side of the piston 89 through the connections 214 and 213 to the sump 18. When the solenoid 216 is deenergized fluid pressure flows from the pump 17 between the connections 212 and 214 to the right hand side of the piston 89 to move it to the left to retract the cutter 30 and is exhausted through the connections 215 and 213 back to the sump 18.

For longitudinal feed fluid pressure is supplied by the pump 17 through the valve 130 and through the metering valve 150 between its connections 154 and 155 and thence to the intake connection 221 of the solenoid operated longitudinal feed control valve 220 for controlling direction of the fluid flow to the longitudinal feed motor 40. When the longitudinal feed control solenoid 225 is energized, fluid pressure flows across the connections 221 and 224 to the left side of the piston 49 to move it to the right, feeding the stitching mechanisms 11 and 15 toward the rear of the machine. Fluid exhausts from the right side of the piston 49, across the connections 223 and 222 and back to the sump through the valves 130 and 170. When the longitudinal feed solenoid 225 is deenergized fluid pressure flows across the connections 221 and 223 to the right of the piston 49 to move it to the left which feeds the stitching mechanisms 11 and 15 back toward their home position. The fluid is exhausted from the left hand side of the piston 49 across the connections 224 and 222 whence it returns to the sump through the valves 130 and 170.

During lateral feed the fluid pressure from the pump 17 first moves the piston 59 in the lateral feed motor 50 in the direction of the arrow upwardly as shown, from approximately a mid-position in the stroke to impart the lateral component of the travel of the needle from C to D. Thereafter direction of lateral feed is reversed twice, first, to impart the lateral feed component of the travel of the needle from D through E to F, and again to impart lateral component during its travel from F back to C, and the buttonhole eye lateral feed is finished in the direction of the arrow. For this purpose, fluid pressure is fed from the pump 17 through the valve 130 and thence to the solenoid operated valve 230, across the connections 231 and 234 and under the piston 59 as shown, the lateral feed control solenoid 235 being deenergized. Fluid is exhausted from above the piston 59 through a check valve 385 thence across the connections 233 and 232 through the valves 130 and 170 and back to the sump. When the solenoid 235 is energized the flow is reversed through the valve 230 and pressure is exerted above the piston 59 to drive it opposite the arrow. The fluid pressure then crosses the connections 231 and 233 from whence it passes through the lateral feed metering valve 180 across its connections 184 and 185 and to the top of the piston 59. The fluid is exhausted from under the piston 59 whence it returns through the valve 230 across the connections 234 and 232 to the sump 18, in the usual manner. Reversal of the valve 230 again reverses movement of the piston 59 and moves it to its original mid-position in the direction of the arrow.

The turrets 19 and 22 of the stitching mechanisms 11 and 15 commence to rotate for stitching around the circular portion DEF of the buttonhole eye when the solenoid 245 controlling the valve 240 is energized to move the piston 78 in the turret drive fluid motor 70 to the left as shown. For this purpose the fluid pressure from the pump 17 flows through the valve 130 thence through an adjusting needle valve 386 and then to the solenoid operated control valve 240 across its connections 241 and 244 and to the right of the piston 78. The fluid is exhausted from the left side of the piston 78 across the connections 243 and 242 thence back to the sump 18 in the usual manner. When the turret control solenoid 245 is deenergized when the stitching mechanisms 11 and 15 return to their home position the fluid pressure from the pump then flows through the control valve 240 across the connections 241 and 243 to the left of the piston 78 to return it to the right. The fluid exhausts from its right hand side and crosses the connections 244 and 242 to the sump 18.

A manual pump 390 is provided for feeding fluid pressure from the sump 18 by hand through a check valve 391 for adjusting and positioning the machine.

*Operation of the machine*

The main switch 382 (Fig. 23) is closed to start the motor 16 which rotates the drive pulley 20 and the pump 17. Material in which a buttonhole is to be formed is placed under the work clamp 26. The starting handle 282 on the top of the bed plate 10 which actuates the arm 281 of the clamping switch 280 is then depressed and the clamping solenoid 206 is energized. Fluid pressure moves the clamping piston 68 and piston rod 62 to the right as viewed in Figs. 3 and 22, clamping the work clamp 26 down upon material which has been placed thereunder.

At the end of the clamping stroke of the piston rod 62 the cam 302 (Fig. 6) moves down to actuate the arm 301 of the cutting switch 300 and the cutting solenoid 216 is energized. Fluid pressure enters the fluid motor 80 through the valve 210 to the left of the piston 89 (as viewed in Fig. 22 or under it as viewed in Fig. 3 and Fig. 6) to move the piston rod 81 to the right or up, which actuates the cutter 30 to cut a buttonhole in the material. As the piston 81 moves up the bell crank arm 82 moves counterclockwise (Fig. 6), and at the end of its movement and after the buttonhole is cut the shoe 312 actuates the arm 311 of the cutter switch 310 and deenergizes the cutter solenoid 216 reversing the direction of fluid pressure flow in the cutter motor 80 which retracts the cutter 30. When the cutter 30 is fully retracted and the bell crank arm 82 is moved back all the way to its original position to the right the cam 322 engages the arm 321 of the switch 320 which energizes the longitudinal feed solenoid 225. Up until this point the needle 13 has remained in its home position A, (Fig. 1) and with the solenoid 225 denergized, fluid pressure to the longitudinal feed motor 40 was exerted on the right hand side of the longitudinal feed piston 48 to maintain the stitching mechanisms in home position. However, when the switch 320 is actuated at the end of the cutting cycle to energize the solenoid 225, the fluid flow is reversed and now flows to the left side of the piston 43 commencing straight longitudinal feed. At this time the rotor 131 of the intermittent valve 130 remains in a stationary valve open position and the unit comprising the housings 12 and 14 supporting the stitching mechanisms 11 and 15 feed rapidly to the right relative to the bed plate 10 and the material under the work clamp 26 and move the needle from A to B. When the needle 13 reaches adjustable position B, the stop mechanism 21 is released and the pulley 20 is engaged to drive the stitching mechanisms 11 and 15 and sewing commences. The rotor 131 of the intermittent valve 130 also commences to rotate at this time and thereupon fluid pressure from the pump 17 and fluid exhausting to the sump 18 passes intermittently through the valve 130 imparting a step-by-step positively controlled longitudinal feed to the piston 48 in the motor 40 for stitching. The stitching mechanisms 11 and 15 progress in a straight line from B to C, along one edge of the buttonhole. The length of the stitching steps is pre-adjusted by the valve 170.

When the needle 13 reaches C it commences to sew around the buttonhole eye 4 toward D. At this time the guide roll 105 has reached point T at the rear end of the groove 106 (Fig. 2). When it leaves the groove 106 the fluid pressure which has been continuously exerted from the start of the operative cycle in the direction of the arrow against the piston 59 in the lateral feed motor 50 now takes effect and the unit of the housings 12 and 14 supporting the needle 13 can rotate around the pivot 101 providing the lateral component to feed the needle 13 along the portion of the buttonhole eye from C to D. As the needle 13 moves along the path from C to D the guide roll 105 which has left the slot 106 at point T travels along the line between T and U in a path corresponding to the first part of the eye in the buttonhole C—D. During this time lateral feed is, of course, intermittent as well as longitudinal feed, both being controlled by rotation of the intermittent valve 130. When the needle 13 reaches D and the guide roll 105 reaches U the set screw 342 (Fig. 7) actuates the arm 341 of the switch 340, energizing the lateral feed control solenoid 235. The fluid pressure flow is reversed in the lateral feed motor 50 and now enters above the piston 59 through the lateral feed metering valve 180 which at this time is partially closed and the direction of lateral feed is reversed in order to cause the needle 13 to travel between the points D, E and F while the guide roll 105 follows a path between the points U, V and W. At the same time the set screw 362, (Fig. 7) actuates the arm 361 in the turret rotation control switch 360 which energizes the turret control solenoid 245. The fluid pressure flow in the turret drive motor 70 is then reversed and enters to the right of the piston 78 (Fig. 22) moving the rack 73 to the left and intermittently rotating the turrets 19 and 22 to position the needle 13 as it sews around the circular portion DEF of the buttonhole eye 4. When the needle 13 reaches E the roller 105 reaches V, and at that time it is necessary to reverse the direction of longitudinal feed back toward home position. For this purpose the set screw 333 (Fig. 7) actuates the arm 332 of the longitudinal feed reversing switch 330 which deenergizes the solenoid 225 and reverses the direction of fluid pressure flow in the fluid motor 40. Pressure then enters to the right of the piston 49 and moves the unit comprising the housings 12 and 14 to the left toward the home position. The needle 13 moves from E to F and the roller 105 from V to W. The set screw 352 (Fig. 7) then actuates the arm 351 of the lateral feed reversing switch 350, and the direction of lateral feed of the motor 50 is again reversed to its original direction indicated by the arrow. The needle 13 then moves from F to C and the roller 105 moves from W back to T where it again enters the groove 106, Figs. 2 and 7. When the roller 105 is in the groove 106 no further lateral feed can take place, although pressure continues to be exerted in the lateral feed fluid motor 50. From then on to the completion of the cycle only the longitudinal feed motor 40 is effective and the needle 13 feeds back in a straight line from C to B. When the needle is at B the stop mechanism 21 is engaged and the stitching mechanisms 11 and 15 and the intermittent valve rotor 131 are disengaged from the driving pulley 20 and stop, whereupon sewing ceases. The longitudinal feed motor 40 continues to move the needle back to home position from B to A in direct feed with the intermittent valve rotor 131 in the original open position.

When the needle is travelling around the circular portion DEF of the buttonhole eye 4 it will be recalled that it must be fed laterally in increasing increments 7 as it moves from D to E and in decreasing increments between E and F. During this time the piston 59 of the lateral feed motor 50, (Fig. 22) is traveling in a direction opposite to that of the arrow and fluid pressure is admitted above the piston 59 through the metering valve 180 which, as has been explained, is normally almost closed for slow lateral feed when its arm 188 is on the low portion of the cam 190. As the needle 13 proceeds from D to E the turret actuating rack 73 is also moving to the left to rotate the turrets 19 and 22 around the circular portion of the eye DEF and the cam 199 moves under the roll 188 on the valve arm 187 gradually to open the valve 189 to a maximum when the high point of the cam 190 passes under the roll 188 just as the needle 13 reaches E. As the needle travels on from E to F the cam 190 continues on under the roll 188 until the latter reaches the opposite low point of the cam and diminishing the increments 7 of lateral feed as the needle approaches point F.

When the needle travelled from C to D and back from F to C the lateral feed was at a constant rate and the metering valve 180 was not in the fluid supply line being by-passed through the check valve 385.

The rate of longitudinal intermittent feed while the needle 13 is travelling from B through C to D remains constant. From D to E as the needle approaches its extreme of longitudinal feed at E the increments 6 must be in decreasing amounts for each step.

For this purpose as the needle 13 approaches E the cam 159 on the rack 73 moves under the roll 158 on the arm 157 of the longitudinal metering valve 150 to close the valve as the needle 13 approaches E. When the needle 13 is at E the high point of the cam 159 is under the roll 158. As the needle 13 moves from E to F the longitudinal increments 6 of feed are gradually increased for each step after its direction is reversed at E and the cam 159 continues on past the roll 158 to open the valve 150 for maximum increments of feed as the needle passes F and starts back toward B at which point sewing is completed.

It will thus be seen that by timing the passage of the cams 159 and 190 operatively with respect to the metering valves 150 and 180 the rate of intermittent progress of the longitudinal feed motor 40 and of the lateral feed motor 50 can be adjusted to cause the needle 13 to travel around the buttonhole eye 4.

The movement of the turret actuating motor 70 commenced when the needle was at D and was completed when it reached F and the turrets 19 and 22 remain in the reversed position all during the travel of the needle from F back to its home position at A. When the machine reaches home position A the bracket 292 (Fig. 7) actuates the arm 371 of the turret reversing switch 370 and the solenoid 245 is deenergized reversing the direction of fluid pressure flow in the motor 70 which returns the piston 78 and rack 73 to the original position to the right. At the same time the bracket 292 actuates the arm 291 of the clamping control switch 290 and deenergizes the clamping solenoid 206. The clamping motor 60 is reversed and the work clamp 26 is retracted from the material which may then be moved from the machine.

I claim:

1. A stitching machine having in combination stitching mechanism and a work clamp movable relatively to each other to form stitches in work which has been placed in the work clamp, a fluid pressure operated motor connected to one of said parts to produce said movement and a valve controlling the flow of fluid under pressure which operates said motor.

2. A stitching machine having in combination stitching mechanism and a work clamp movable relatively to each other to form stitches in work which has been placed in the work clamp, and operating mechanism connected to one of said parts and producing a step by step stitching movement of said parts said operating mechanism including means limiting positively the extent of movement of said part between successive stitches and adjusting means by which the length of the stitching steps may be changed.

3. A stitching machine having in combination stitching mechanism and a work clamp movable relatively to each other to form stitches in work which has been placed in the work clamp and operating mechanism connected to one of said parts and producing a step by step stitching movement of said parts said operating mechanism including means limiting positively the extent of movement of said part between successive stitches and means operating in accordance with the relative positions of the stitching mechanism and the work clamp for varying the length of successive stitching steps.

4. A stitching machine having in combination stitching mechanism and a work clamp movable relatively to each other to form stitches in work which has been placed in the work clamp, and operating mechanism connected to one of said parts and producing a step by step stitching movement of said parts said operating mechanism including means limiting positively the extent of movement of said part between successive stitches and adjusting means by which the length of the stitching steps may be changed and means operating in accordance with the relative positions of the stitching mechanism and the work clamp for varying the length of successive stitching steps.

5. A stitching machine having in combination stitching mechanism and a work clamp movable relatively to each other to form stitches in work which has been placed in the work clamp, a fluid pressure operated motor connected to one of said parts to produce said movement, an intermittently opening valve controlling the flow of operating fluid, and mechanism actuating said valve in time with the stitching mechanism to impart a step by step movement to the parts.

6. A stitching machine having in combination stitching mechanism and a work clamp movable relatively to each other to form stitches in work which has been placed in the work clamp, a fluid pressure operated motor connected to one of said parts to produce said movement, a valve admitting fluid under pressure to the motor, and mechanism actuating said valve in time with the stitching mechanism to admit fluid under pressure intermittently to said motor.

7. A stitching machine having in combination stitching mechanism and a work clamp movable relatively to each other to form stitches in work which has been placed in the work clamp, a fluid pressure operated motor connected to one of said parts to produce said movement, an intermittently opening valve controlling the flow of fluid exhausted from said motor and mechanism actuating said valve in time with the stitching mechanism to impart a step by step movement to the parts.

8. A stitching machine having in combination stitching mechanism and a work clamp movable relatively to each other to form stitches in work which has been placed in the work clamp, a fluid pressure operated motor connected to one of said parts to produce said movement, two valves one on the inlet side and the other on the outlet side both open at the same time and both closed at the same time and controlling the flow of fluid under pressure which operates said motor, and mechanism actuating said valves in time with the stitching mechanism to impart a step by step movement to the parts.

9. A stitching machine having in combination stitching mechanism and a work clamp movable relatively to each other to form stitches in work which has been placed in the work clamp, a fluid pressure operated motor connected to one of said parts to produce said movement, an intermittently opening valve controlling the flow of operating fluid, mechanism actuating said valve in time with the stitching mechanism to impart a step by step movement to the parts, and a reversing valve for said motor controlling the direction of flow of operating fluid through said motor.

10. A stitching machine having in combination stitching mechanism and a work clamp movable relatively to each other to form stitches in work which has been placed in the work clamp, a fluid pressure operated motor connected to one of said parts to produce said movement, an intermittently opening valve controlling the flow of operating fluid, mechanism actuating said valve in time with the stitching mechanism to impart a step by step movement to the parts and a metering valve operated in time with the position of one of said relatively movable parts to vary the amount of flow of fluid in said motor.

11. A stitching machine having in combination stitching mechanism and a work clamp movable relatively to each other to form stitches in work which has been placed in the work clamp, a fluid pressure operated motor connected to one of said parts to produce said movement, an intermittently opening valve controlling the flow of operating fluid, mechanism actuating said valve in time with the stitching mechanism to impart a step by step movement to the parts and a metering valve operating to adjust the amount of flow of fluid in said motor.

12. A stitching machine having in combination stitching mechanism and a work clamp movable relatively to each other to form stitches in work which has been placed in the work clamp, actuating mechanism for the stitching mechanism, two fluid pressure operated motors connected to said parts to produce said movement, a fluid pressure system supplying fluid under pressure to said motors, an intermittently opening valve controlling the flow of fluid under pressure which operates said motors, and mechanism actuating said valve in time with the stitching mechanism to impart a step-by-step movement to the parts.

13. A stitching machine having in combination stitching mechanism and a work clamp movable relatively to each other to form stitches in work which has been placed in the work clamp, actuating mechanism for the stitching mechanism, two fluid pressure operated motors producing said relative movement, a fluid pressure system having branches supplying fluid under pressure to said motors, an intermittently opening valve controlling the flow of fluid under pressure which operates said motors, mechanism actuating said valve in time with the stitching mechanism to impart a step-by-step movement to the parts, and a metering valve operated in time with the position of one of said relatively movable parts to vary the amount of flow of fluid in one of said motors.

14. A stitching machine having in combination stitching mechanism and a work clamp movable relatively to each other to form stitches in work which has been placed in the work clamp, actuating mechanism for the stitching mechanism, two fluid pressure operated motors each connected to one of said parts to produce said movement, a fluid pressure system supplying fluid under pressure to said motors, an intermittently opening valve controlling the flow of fluid exhausting from said motors and mechanism actuating said valve in time with the stitching mechanism to impart a step-by-step movement to the parts.

15. A stitching machine having in combination stitching mechanism and a work clamp movable relatively to each other to form stitches in work which has been placed in the work clamp, actuating mechanism for the stitching mechanism, two fluid pressure operated motors connected to said parts to produce said movement, a fluid pressure system supplying fluid under pressure to said motors, two valves both open at the same time and both closed at the same time and controlling the flow of operating fluid, and mechanism actuating said valves in time with the stitching mechanism to impart a step by step movement to the parts.

16. A stitching machine and in combination stitching mechanism and a work clamp movable lengthwise and crosswise relatively to each other to form stitches in work which has been placed in the work clamp, a fluid pressure motor to move one of said parts lengthwise of the work relative to the other, a fluid pressure motor to move one of said parts crosswise of the work relative to the other, and a valve associated with said fluid pressure motors to control the flow of operating fluid, means actuating said valve in time with said stitching mechanism to impart a step-by-step relative lengthwise and crosswise movement to said parts.

17. A stitching machine having in combination stitching mechanism and a work clamp movable relatively to each other to form stitches in work which has been placed in the work clamp, actuating mechanism for the stitching mechanism, two fluid pressure operated motors connected to the two first members to produce said movement, a fluid pressure system supplying fluid under pressure to said motors, an intermittently opening valve controlling the flow of operating fluid, mechanism actuating said valve in time with the stitching mechanism to impart a step-by-step movement to the parts, a reversing valve for at least one of said motors to reverse its direction of movement, and mechanism for actuating said reversing valve responsive to the movement of said parts.

18. A stitching machine having in combination stitching mechanism and a work clamp movable relatively to each other to form stitches in work which has been placed in the work clamp, actuating mechanism for the stitching mechanism, a pair of fluid pressure operated motors connected to said parts to produce said movement, a fluid pressure system supplying fluid under pressure to said motors, valves controlling the supply of fluid to the two motors, and operating means for said valves arranged to increase in predetermined proportion the supply of fluid under pressure to one motor as the supply to the other is decreased.

19. A stitching machine and in combination rotatable stitching mechanism and a work clamp movable relatively to each other to form stitches in work which has been placed in the work clamp, actuating mechanism and rotating mechanism for the stitching mechanism, fluid pressure operated motors connected to said parts to produce said relative movement, a fluid pressure system supplying fluid under pressure to said motors, intermittently opening valves controlling the flow of operating fluid, mechanism actuating said valves in time with the stitching mechanism to impart a step-by-step movement to the parts, and another fluid pressure operated motor connected to said fluid pressure system and actuating said rotating mechanism in timed relation with said step-by-step movement of said parts.

20. A stitching machine having in combination stitching mechanism and a work clamp movable relatively to each other to form stitches in work which has been placed in the work clamp, a fluid pressure operated motor connected to one of said parts to produce said relative movement, an intermittently opening valve controlling the flow of operating fluid, mechanism actuating said valve in time with the stitching mechanism to impart a step-by-step relative movement to the parts, and another fluid pressure operated motor connected to said work clamp and actuating it at least once during the operative cycle of said machine.

21. A stitching machine having in combination stitching mechanism and a work clamp movable relatively to each other to form stitches in work which has been placed in the work clamp, a fluid pressure operated motor connected to one of said parts to produce said movement, an intermittently opening valve controlling the flow of operating fluid in time with the stitching mechanism to impart a step-by-step movement to the parts, a reversing valve for said motor controlling the direction of flow of operating fluid through said motor to reverse its direction of movement, and mechanism to actuate said reversing valve, said mechanism being actuated at a predetermined point in said relative movement of said stitching mechanism and work clamp.

22. A stitching machine having in combination stitching mechanism and a work clamp movable relatively to each other to form stitches in work which has been placed in the work clamp, actuating mechanism for the stitching mechanism, fluid pressure operated motors connected to said parts to produce said movement, a fluid pressure system supplying fluid under pressure to said motors, intermittently opening valves controlling the flow of operating fluid, mechanism actuating said valves in time with the stitching mechanism to impart a step-by-step movement to the parts, and another fluid pressure operated motor connected to said work clamp and actuating it once during the operative cycle of said machine.

23. A stitching machine having in combination stitching mechanism and a work clamp movable relatively to each other to form stitches in work which has been placed in the work clamp, actuating mechanism for the stitching mechanism, fluid pressure operated motors connected to said parts to produce said movement, a fluid pressure system supplying fluid under pressure to said motors, intermittently opening valves controlling the flow of operating fluid, mechanism actuating said valves in time with the stitching mechanisms to impart a step-by-step movement to the parts, a reversing valve for at least one of said motors to reverse its direction of movement, and electric-control mechanism to actuate said reversing valve, said mechanism being actuated at a pre-determined point in said relative movement of the stitching mechanism and work clamp.

24. A stitching machine having in combination stitching mechanism and a work clamp movable relatively to each other to form stitches in work which has been placed in the work clamp, actuating mechanism for the stitching mechanism, a pair of fluid pressure operated motors connected to said parts to produce said movement, a fluid pressure system supplying fluid under pressure to said motors, valves controlling the supply of fluid to the two motors, operating means for said valves arranged to increase in predetermined proportion the supply of fluid under pressure to one motor as the supply to the other is decreased, a reversing valve for at least one of said motors to reverse its direction of movement and mechanism for actuating said reversing valve actuated at a pre-determined point in said relative movement of the stitching mechanism and work clamp.

FRANKLIN A. REECE.

REFERENCES CITED

The following references are of record in the file of this patent:

UNITED STATES PATENTS

| Number | Name | Date |
|---|---|---|
| 2,411,493 | Wood | Nov. 19, 1946 |

FOREIGN PATENTS

| Number | Country | Date |
|---|---|---|
| 565,651 | Great Britain | Nov. 21, 1944 |